United States Patent
Lin

(10) Patent No.: US 8,979,391 B2
(45) Date of Patent: Mar. 17, 2015

(54) PHOTOELECTRIC COUPLING MODULE

(71) Applicant: Hon Hai Precision Industry Co., Ltd., New Taipei (TW)

(72) Inventor: I-Thun Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/968,394

(22) Filed: Aug. 15, 2013

(65) Prior Publication Data

US 2014/0199030 A1   Jul. 17, 2014

(30) Foreign Application Priority Data

Jan. 17, 2013  (TW) .............................. 102101726 A

(51) Int. Cl.
*G02B 6/42* (2006.01)
*G02B 6/36* (2006.01)
*G02B 6/32* (2006.01)

(52) U.S. Cl.
CPC ................ *G02B 6/32* (2013.01); *G02B 6/4214* (2013.01); *G02B 6/4246* (2013.01); *G02B 6/4255* (2013.01)
USPC ........................................... 385/89; 385/147

(58) Field of Classification Search
USPC .............. 385/88, 89, 90, 137, 147, 33, 53–79
See application file for complete search history.

(56) References Cited

U.S. PATENT DOCUMENTS

| | | | |
|---|---|---|---|
| 4,313,654 A * | 2/1982 | Matsui et al. ................. | 396/106 |
| 6,795,602 B2 * | 9/2004 | Neukermans et al. .......... | 385/18 |
| 2014/0147078 A1 * | 5/2014 | Bhagavatula et al. .......... | 385/33 |
| 2014/0209791 A1 * | 7/2014 | Wu ............................... | 250/216 |
| 2014/0209792 A1 * | 7/2014 | Wu ............................... | 250/216 |
| 2014/0254985 A1 * | 9/2014 | Lai ................................ | 385/33 |

* cited by examiner

*Primary Examiner* — Akm Enayet Ullah
(74) *Attorney, Agent, or Firm* — Novak Druce Connolly Bove + Quigg LLP

(57) ABSTRACT

A photoelectric coupling module includes a substrate, a photoelectric unit, and a lens module. The photoelectric unit is positioned on the substrate, and includes at least one light emitter and at least one light receiver. The lens module is positioned on the substrate, and includes a reflection surface, at least two first lenses, and at least two coupling portions. Each coupling portion includes a receiving part and a second lens received in the receiving part. Optical axes of the first lenses cross optical axes of the second lenses of the at least two coupling portions on the reflection surface. The first lenses are aligned with the at least one light emitter and the at least one light receiver.

10 Claims, 3 Drawing Sheets

PHOTOELECTRIC COUPLING MODULE

BACKGROUND

1. Technical Field

The present disclosure relates to photoelectric technologies and, particularly, to a photoelectric coupling module.

2. Description of Related Art

Photoelectric coupling modules generally include a lens module, optical fibers, and a photoelectric unit. The lens module is coupled between the optical fibers and the photoelectric unit. If the optical fibers are not aligned with lenses of the lens module, an optical efficiency of the photoelectric coupling module is decreased.

Therefore, it is desirable to provide a photoelectric coupling module that can overcome the limitations described.

DETAILED DESCRIPTION

Embodiments of the disclosure will be described with reference to the drawings.

Figure 1:
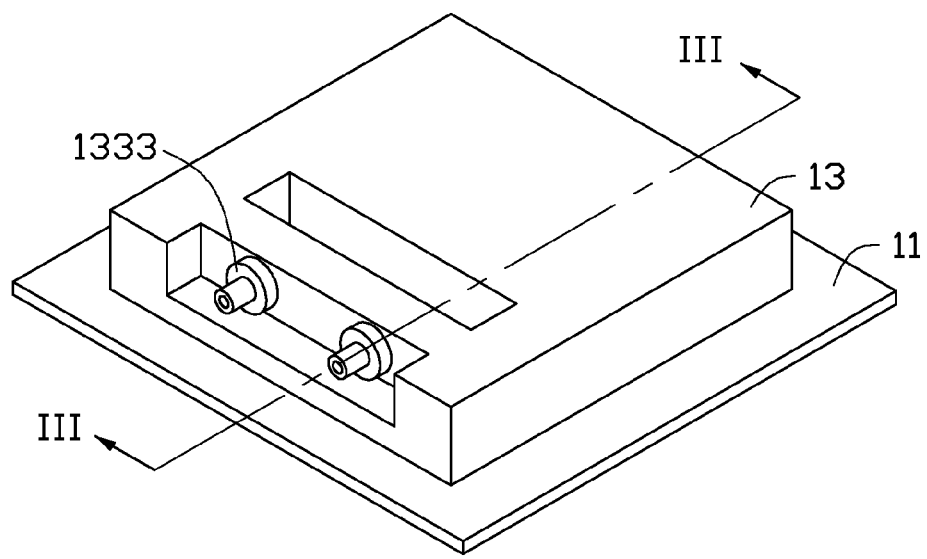
FIG. 1 is a schematic view of a photoelectric coupling module in accordance with an exemplary embodiment.
Figure 2:
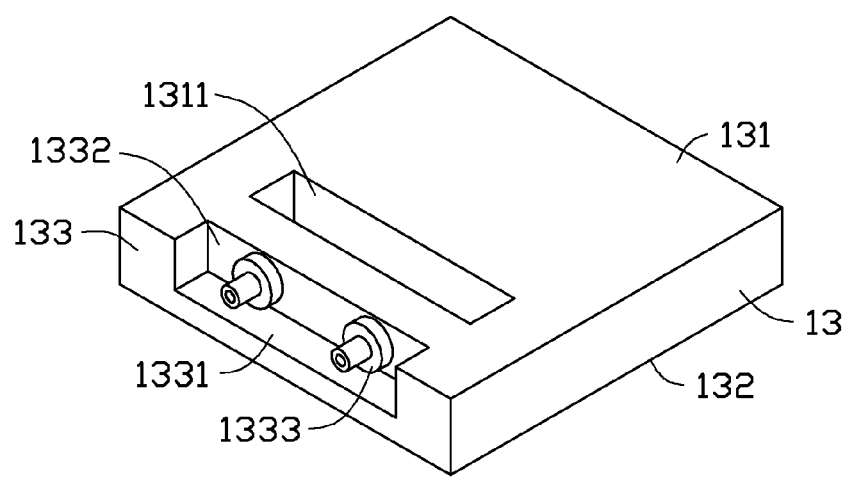
FIG. 2 is an isometric, exploded, and schematic view of the photoelectric coupling module of FIG. 1.
Figure 2:
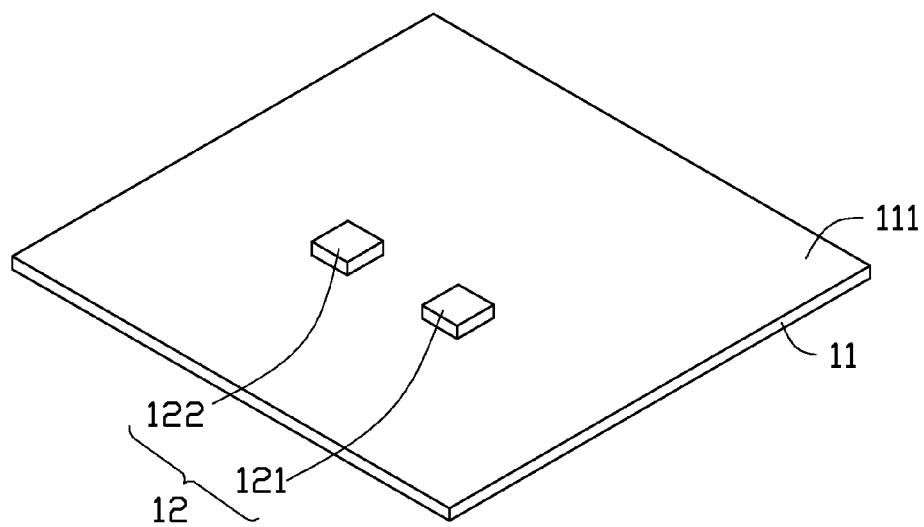
Figure 3:
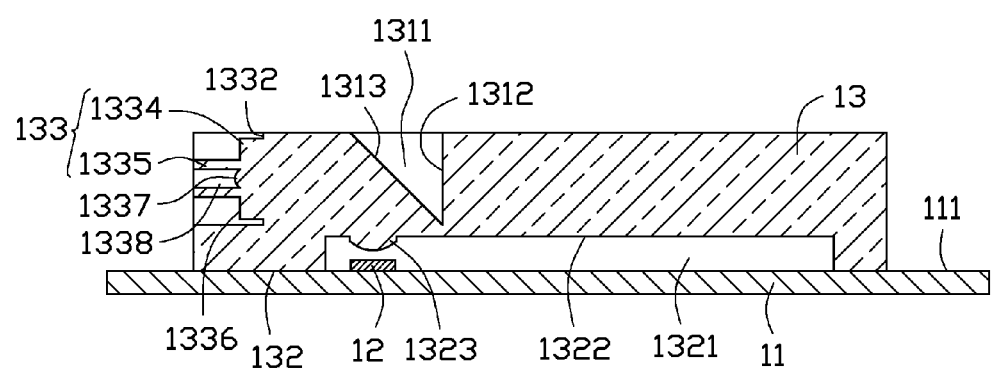
FIG. 3 is a cross-sectional view taken along a line of FIG. 1.

FIGS. 1-3 show a photoelectric coupling module 10 according to an exemplary embodiment. The photoelectric coupling module 10 includes a substrate 11, a photoelectric unit 12, and a lens module 13.

The substrate 11 is a printed circuit board and includes a bearing surface 111.

The photoelectric unit 12 is positioned on the bearing surface 111, and includes at least one light emitter 121, such as a laser diode, and at least one light receiver 122, such as a photo diode. The at least one light emitter 121 is electrically connected to the substrate 11, and convert electronic signals into corresponding light signals in a form of light rays. The at least one light receiver 122 is electrically connected to the substrate 11, and receive and convert light rays into corresponding electronic signals. The number of at least one the light emitter 121 is equal to the number of the at least one light receiver 122. The at least one light emitter 121 and the at least one light receiver 122 are linearly arranged.

In the embodiment, the photoelectric unit 12 includes one light emitter 121 and one light receiver 122 arrayed along one line with the light receiver 121.

The lens module 13 is substantially rectangular and is made of transparent material, such as plastic or glass. The lens module 13 is supported on the substrate 11. The lens module 13 includes a top surface 131, a bottom surface 132, and a side surface 133. The bottom surface 132 is opposite to the top surface 131, and the side surface 133 is substantially perpendicularly connected between the top surface 131 and the bottom surface 132.

The lens module 13 defines an elongated first recess 1311 in the top surface 131, and a cross-section of the first recess 1311 taken along a direction that is substantially perpendicular to a lengthwise direction of the first recess 1311 is triangular. The first recess 1311 includes an inner surface 1312 substantially perpendicular to the top surface 131 and a reflection surface 1313 tilting about 45 degrees relative to the inner surface 1312.

The lens module 13 defines a substantially rectangular second recess 1321 in the bottom surface 132. The second recess 1321 includes a lower surface 1322 substantially parallel to the top surface 131. At least two first lenses 1323 are formed on the lower surface 1322, located within an orthogonal projection of the reflection surface 1313 onto the bottom surface 132. In the embodiment, the first lenses 1323 are convex lenses. The first lenses 1323 are arrayed along one line and face the reflection surface 1313. The number of the first lenses 1323 is equal to the total number of the light emitter 121 and the light receiver 122. In the embodiment, the lens module 13 includes two first lenses 1323.

The lens module 13 defines a substantially rectangular third recess 1331 in the side surface 133. The third recess 1331 runs through the top surface 131, and includes a connecting surface 1332 substantially parallel to the inner surface 1312. At least two coupling portions 1333 extend outward from the connecting surface 1332. Each of the coupling portions 1333 includes a connecting part 1334 and a receiving part 1335 connected to the connecting part 1334. The connecting part 1334 is connected to the connecting surface 1332, and includes an end surface 1336. A second lens 1337 is formed on the end surface 1336, located within an orthogonal projection of the reflection surface 1313 onto the side surface 133. In the embodiment, the second lenses 1337 are convex lenses. The second lenses 1337 are arrayed along one line and face the reflection surface 1313. The receiving part 1335 is hollow shaped, and includes a receiving room 1338. The receiving part 1335 is positioned on the end surface 1336. The second lens 1337 formed on the connecting part 1334 is received in the receiving room 1338.

The number of the second lenses 1337 is equal to the number of the first lenses 1323. An optical axis of each second lens 1337 is perpendicular to an optical axis of each first lens 1323. The optical axes of the first lenses 1323 cross the optical axes of the second lenses 1337 on the reflection surface 1313. In the embodiment, the lens module 13 includes two second lenses 1337.

In the embodiment, the connecting part 1334 and the receiving part 1335 are cylinders. An external diameter of the connecting part 1334 is greater than an external diameter of the receiving part 1335. An external diameter of the second lenses 1337 is less than an internal diameter of the receiving room 1338.

In assembly, the light emitters 121 and the light receivers 122 are mounted on the bearing surface 111 by a surface-mount technology (SMT). The lens module 13 is positioned on the substrate 11, and the bottom surface 112 is connected to the bearing surface 111. The light emitters 121 and the light receivers 122 are received in the second recess 1321. The second recess 1321 is sealed by the substrate 11. In the embodiment, the bottom surface 112 is attached to the bearing surface 111 via glue. The reflection surface 1313 tilts about 45 degrees relative to the bearing surface 111, and the lower surface 1322 is parallel to the bearing surface 111. The first lenses 1323 face the light emitters 121 and the light receivers 122. The optical axes of the first lenses 1323 are aligned with the light emitters 121 and the light receivers 122. One end of each optical fiber (not shown) is received in the receiving room 1338 of the coupling portions 1333, and the optical fibers are coupled to the second lenses 1321.

During the process of emitting the light rays, the light emitters 121 emit light rays to the first lenses 1323 along a direction perpendicular to the lower surface 1322. The light rays are converged by the first lenses 1323, and are projected onto the reflection surface 1313. The reflection surface 1313 reflects the light rays to the second lenses 1337. The light rays are converged by the second lenses 1337, and emit to the optical fiber received in the receiving room 1338 of the coupling portions 1333.

During the process of receiving light rays, the light rays emitting from the optical fiber enter into the lens module 13 through the second lenses 1337. The light rays are converged by the second lenses 1337, and are projected onto the reflection surface 1313. The reflection surface 1313 reflects the light rays to the first lenses 1323. The light rays are converged by the first lenses 1323, and are projected to the light receivers 122. The light receivers 122 convert the light rays into electronic signals, and the electronic signals are transmitted to the substrate 11.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A photoelectric coupling module, comprising:
   a substrate comprising a bearing surface;
   a photoelectric unit positioned on the bearing surface, and comprising at least one light emitter and at least one light receiver;
   a lens module positioned on the bearing surface, and comprising a top surface, a bottom surface opposite to the top surface, and a side surface connected between the top surface and the bottom surface; the lens module defining a first recess in the top surface, a second recess on the bottom surface, and a third recess on the side surface; the first recess comprising a reflection surface tilting about 45 degrees relative to the bearing surface; the second recess comprising a lower surface parallel to the bearing surface; the third recess comprising a connecting surface perpendicular to the bearing surface; the reflection surface facing the connecting surface and the lower surface;
   at least two first lenses formed on the bottom surface; and
   at least two coupling portions extending outward from the connecting surface; each coupling portion comprising a receiving part and a second lens received in the receiving part; optical axes of the first lenses crossing optical axes of the second lenses of the at least two coupling portions on the reflection surface; the first lenses aligned with the at least one light emitter and the at least one light receiver.

2. The photoelectric coupling module of claim 1, wherein a number of the first lenses or the second lenses is respectively equal to a total number of the at least one light emitter and the at least one light receiver.

3. The photoelectric coupling module of claim 2, wherein the number of the first lenses is equal to the number of the second lenses.

4. The photoelectric coupling module of claim 1, wherein the at least one light emitter and the at least one light receiver are received in the second recess.

5. The photoelectric coupling module of claim 1, wherein the substrate is a printed circuit board, and the at least one light emitter and the at least one light receiver are electrically connected to the printed circuit board.

6. The photoelectric coupling module of claim 5, wherein the second recess is sealed by the substrate.

7. The photoelectric coupling module of claim 1, wherein each coupling portion comprises a connecting part connected to the connecting surface, and the connecting part comprises an end surface, each second lens is formed on the end surface of the connecting part of each coupling portion, the receiving part is positioned on the end surface.

8. The photoelectric coupling module of claim 7, wherein the receiving part is hollow shaped, and comprises a receiving room, each second lens is received in the receiving room of each coupling portion.

9. A photoelectric coupling module, comprising:
   a substrate;
   a photoelectric unit positioned on the substrate, and comprising at least one light emitter and at least one light receiver; and
   a lens module positioned on the substrate, and comprising a reflection surface, at least two first lenses, and at least two coupling portions; each coupling portion comprising a receiving part and a second lens received in the receiving part; optical axes of the first lenses crossing optical axes of the second lenses of the at last two coupling portions on the reflection surface; the first lenses aligned with the at least one light emitter and the at least one light receiver.

10. The photoelectric coupling module of claim 9, wherein the receiving part is hollow shaped, and comprises a receiving room, each second lens is received in the receiving room.

* * * * *